United States Patent
Hattori

Patent Number: 5,805,296
Date of Patent: Sep. 8, 1998

[54] OPTICAL SCANNING APPARATUS INCLUDING AN IMAGE READING SECTION AND AN IMAGE PRINTING SECTION THAT SHARE A COMMON OPTICAL SYSTEM AND A METHOD OF PRINTING AND READING AN IMAGE USING THE COMMON OPTICAL SYSTEM

[75] Inventor: Yutaka Hattori, Kuwana, Japan

[73] Assignee: Brother Kogyo Kabushiki Kaisha, Nagoya, Japan

[21] Appl. No.: 666,626

[22] Filed: Jun. 18, 1996

[30] Foreign Application Priority Data

Aug. 11, 1995 [JP] Japan ................................. 7-205625

[51] Int. Cl.$^6$ ............................. H04N 1/04; G03G 15/00
[52] U.S. Cl. .................... 358/300; 358/474; 358/481; 347/241; 399/5; 399/118
[58] Field of Search ................................. 358/296, 300, 358/401, 472, 471, 474, 480–483; 347/112, 129, 134, 224, 225, 241, 243, 244, 256, 258–261; 399/3, 4, 5, 107, 110, 118

[56] References Cited

U.S. PATENT DOCUMENTS

| | | | |
|---|---|---|---|
| 4,241,990 | 12/1980 | Fisli | 358/300 X |
| 4,374,617 | 2/1983 | Fisli | 399/5 |
| 4,575,214 | 3/1986 | Carley | 399/5 |
| 5,017,961 | 5/1991 | Hasegawa et al. | 399/5 |
| 5,122,817 | 6/1992 | Hasegawa et al. | 358/296 X |
| 5,377,291 | 12/1994 | Hatakoshi et al. | 359/332 X |
| 5,596,424 | 1/1997 | Iizuka et al. | 358/300 X |

FOREIGN PATENT DOCUMENTS

A-7-199097  8/1995  Japan ................ G02B 26/10

OTHER PUBLICATIONS

Optics, Chapter 10 "Diffraction", Eugene Hecht, pp. 424–427, undated.

Primary Examiner—Peter S. Wong
Assistant Examiner—Gregory J. Toatley, Jr.
Attorney, Agent, or Firm—Oliff & Berridge, PLC

[57] ABSTRACT

An optical scanning apparatus includes a semiconductor laser, a polygonal mirror as a deflector for scanning a light beam from the laser, a photosensitive drum for forming an electrostatic latent image, a converging lens for converging the light beam from the laser onto the photosensitive drum, and a reflection mirror located between the deflector and the photosensitive drum. The reflection mirror is adapted to reflect the light beam so that a light beam reflected by the reflection mirror is used to read a source document placed at a position that is the conjugate of the position of the photosensitive drum surface with respect to the converging device. Inside the casing of the semiconductor laser are a beam splitter for light path separation and a photosensor. The apparatus has an image reader section and a laser printer section, which share a common optical system, thus providing a compact design and cost reduction and also equalizes the accuracy of image reading and printing.

27 Claims, 7 Drawing Sheets

OPTICAL SCANNING APPARATUS INCLUDING AN IMAGE READING SECTION AND AN IMAGE PRINTING SECTION THAT SHARE A COMMON OPTICAL SYSTEM AND A METHOD OF PRINTING AND READING AN IMAGE USING THE COMMON OPTICAL SYSTEM

BACKGROUND OF THE INVENTION

1. Field of the Invention

The present invention relates to an optical scanning apparatus used in a laser beam printer or the like, which prints images based on electrophotography. This invention particularly relates to an optical scanning apparatus that reads an image on a source document.

2. Description of Related Art

Known laser beam printers project a laser beam that is modulated by an image signal onto a photosensitive drum of photoconductive material, record the image signal as an electrostatic latent image, and transfer the image of toner onto paper to produce a printed image. Known image readers read an image on a source document in a two-dimensional manner by means of a one-dimensional CCD and a scanning mirror. Furthermore, there are known apparatuses that function as a laser beam printer and image reader simultaneously, i.e., having a copy function. Such a device reads an image on a source document and prints out the image immediately.

FIG. 1 is a schematic diagram explaining a conventional apparatus. In the image reader section of the apparatus, which is at the upper portion of the figure, the image of a source document 9 that is placed on a document stage 10 is formed on a CCD 14 by a focusing lens 15 by way of a full-speed scanning mirror 11 and half-speed scanning mirror 12. A line light source 13, which extends in the depth direction of the figure, moves together with the full-speed scanning mirror 11 and illuminates the scanning surface of the document 9.

As seen in FIG. 1, the full-speed scanning mirror 11 is located at the left-end position shown by the solid line when the scanning operation begins, moves to the right for scanning the document 9, and terminates the scanning at the right-end position shown by the dashed line. The half-speed scanning mirror 12, which consists of a pair of mirrors, moves for scanning from its solid-line position to its dashed-line position.

The full-speed scanning mirror 11 and half-speed scanning mirror 12 have scanning speeds of 2-to-1 ratio. Accordingly, the light path length from the document 9 to the focusing lens 15 is kept constant, resulting in an even focused image on the CCD 14 regardless of the scanning operation. The CCD 14 consists of multiple photosensors aligned in the direction perpendicular to the scanning direction.

In the laser printer section of the apparatus that is shown at the lower portion of FIG. 1, a laser (not shown) emits a laser beam, which is modulated in response to the image signal produced by the image reader section, to a polygonal mirror 5. The polygonal mirror 5 having six reflection surfaces is rotating constantly, thereby deflecting the incident laser beam. The deflected laser beam goes through a scanning lens 6 and is directed downwardly by a reflection mirror 8 to a photosensitive drum 7.

The photosensitive drum 7 has been charged to a positive or negative polarity in advance, and it is discharged only in portions where the laser beam is projected. Accordingly, when toner, which has been charged to the polarity opposite to the drum pre-charging, is applied to the photosensitive drum 7, it stays only in portions where the laser beam has been projected. The toner image is transferred onto paper, and the image read by the image reader section is printed in black on the paper.

However, this apparatus including the image reader section and laser printer section within the same unit as shown in FIG. 1 is bulky and expensive. Moreover, due to unmatched performance of resolution of image reading and printing, if only one section has superior performance it cannot be used effectively.

SUMMARY OF THE INVENTION

A primary object of the embodiment of this invention is to overcome at least the foregoing prior art deficiency and to provide an optical scanning apparatus that has an image reader section and laser printer section that share a common optical system for reading and printing an image on a source document. Thereby, a compact and low-cost apparatus capable of reading and printing an image at the same resolution is achieved.

To achieve at least the above objective, the optical scanning apparatus is designed such that a light beam from a light source is deflected for scanning by a deflector and converged by a converging device. At image printing, the light beam is projected onto a photosensitive drum by means of a reflection device. At image reading the light beam is projected onto a source document, and the reflected light from the document is deviated and directed by a beam splitter within the case of the light source to a photosensor, which is located at a position different from the light source.

The light source used in this optical scanning apparatus is preferably a laser that emits a directive light beam, which has an enhanced coupling efficiency and produces a smaller light spot diameter on the projection plane. In the preferred embodiment, the apparatus employs a semiconductor laser so as to foster compactness and facilitate mounting. The laser beam produced by the semiconductor laser is converted by a nonlinear optical device to a visible light having a shorter wavelength range of 400–700 nm so that source documents written with ink or printed with dye can be read accurately.

The beam splitter for light path separation is based on the diffraction effect and is small enough to be accommodated within the laser diode case. The diffracted light beam is deflected by it to the photosensor.

The apparatus has an obscuring device that prevents the diffracted light beam from reaching the photosensitive drum and document, enabling high-quality image reading and printing. The diffractive beam splitter diffracts the light beam in the direction perpendicular to the scanning direction of the deflector to prevent the diffracted light from reaching the photosensitive drum and document, enabling high-quality image printing.

The beam splitter for light path separation may be a low-cost half mirror, in which case the light coming back from the document is reflected and directed to the photosensor. The converging device is an fθ lens, which simplifies the modulation circuit and reduces the number of parts and cost, and the scanning light spot on the projection plane has a constant line speed.

Because of an equal light spot diameter on the photosensitive drum and document, the apparatus operates at the same image reading and printing resolution without the need of a matching procedure.

BRIEF DESCRIPTION OF THE DRAWINGS

Preferred embodiments of the present invention are described in detail with reference to the following drawings in which.

DETAILED DESCRIPTION OF PREFERRED EMBODIMENTS

The optical scanning apparatus based on a preferred embodiment of this invention is explained with reference to the drawings. Component parts identical to those of the foregoing conventional apparatus are referred to with common symbols throughout the drawings.

Figure 1:
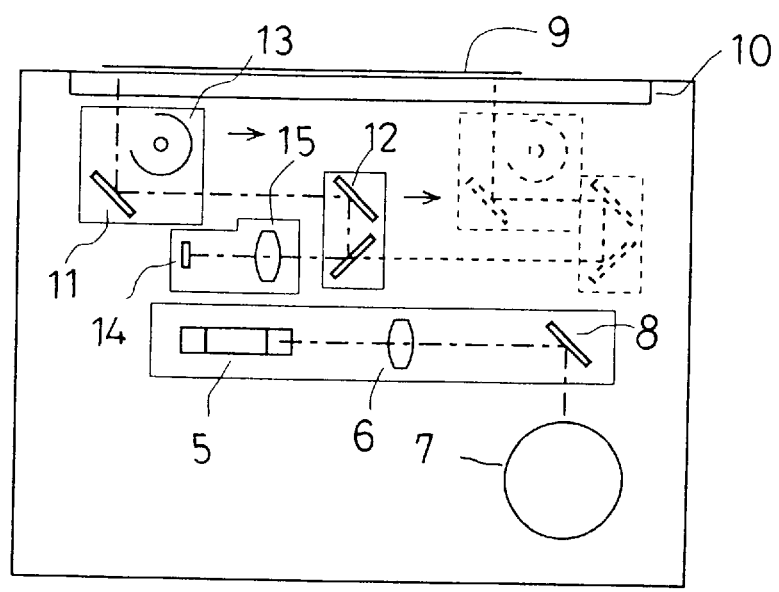
FIG. 1 is a schematic diagram showing the structure of a conventional optical scanning apparatus.
Figure 2:
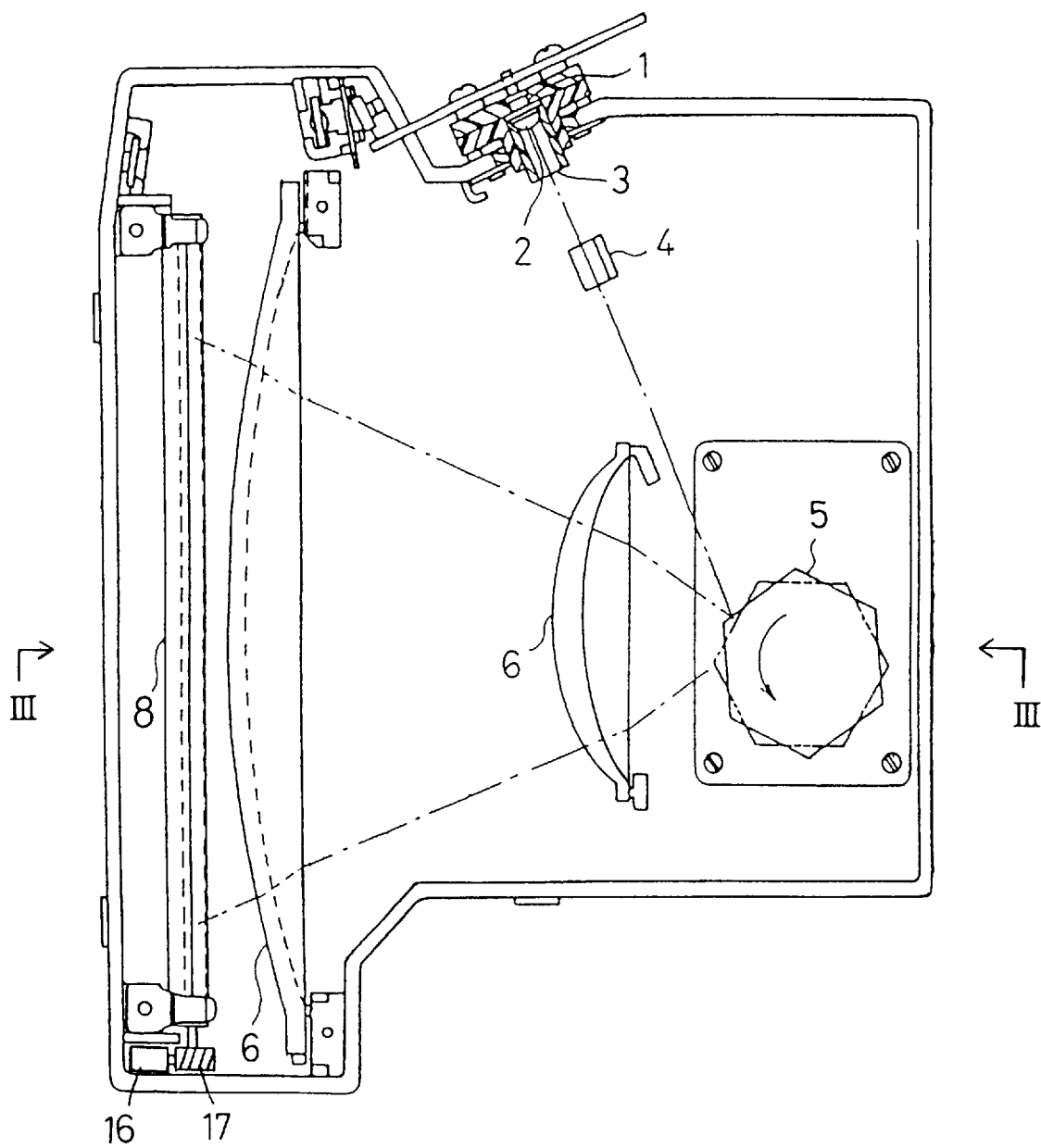
FIG. 2 is a plan view in partial section of the optical scanning apparatus based on an embodiment of this invention.
Figure 3:
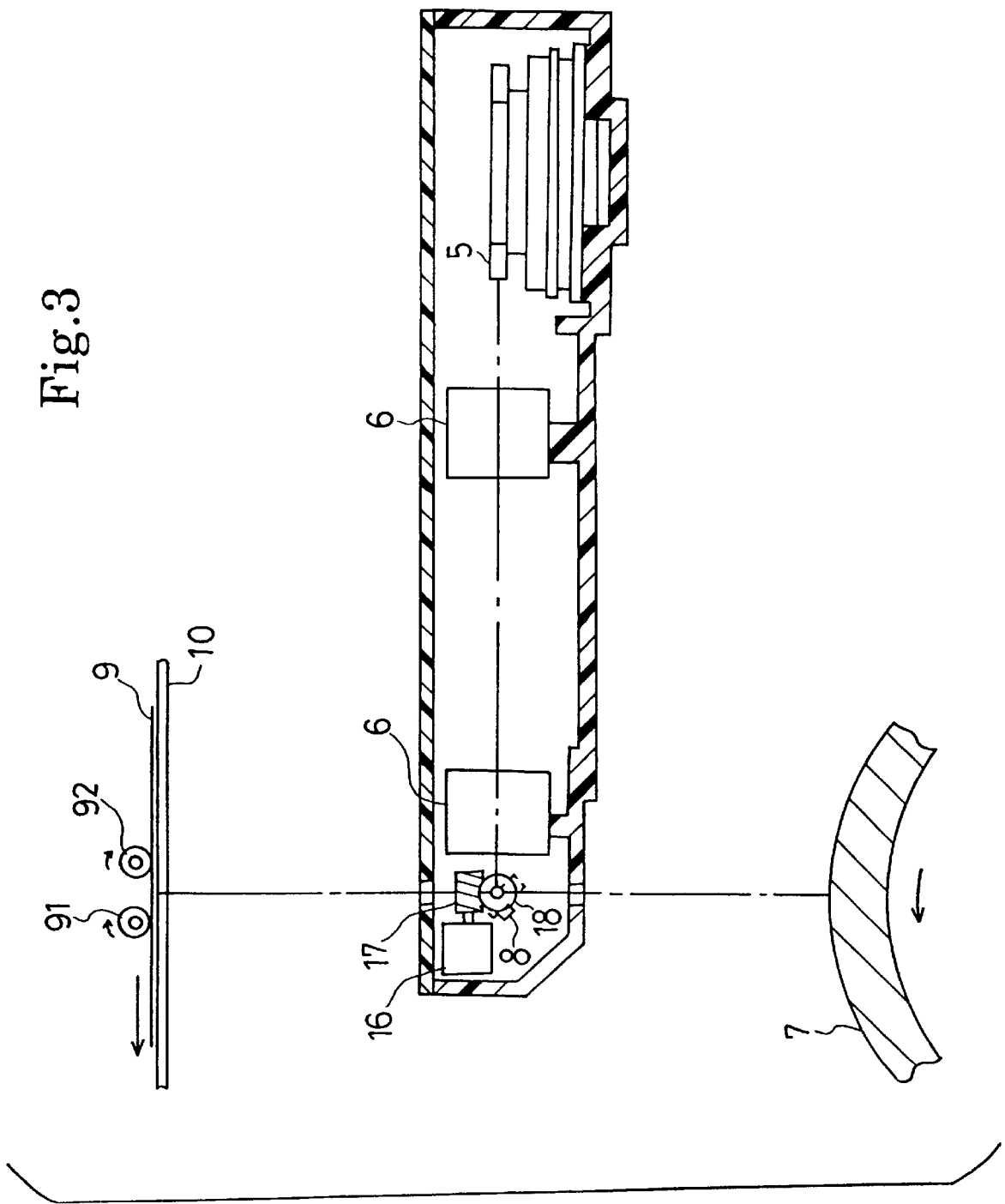
FIG. 3 is a partial cross-sectional view of the optical scanning apparatus taken along the line III—III of FIG. 2.

FIG. 2 and FIG. 3 show the structure of the optical scanning apparatus of the preferred embodiment. FIG. 2 is a plan view of the apparatus and FIG. 3 is a cross-sectional view taken along the line III—III of FIG. 2.

At image printing, a light beam emitted by a semiconductor laser 1 as a light source is collimated by a collimator lens 2. A diaphragm 3 placed in the light path is used to limit the beam diameter as desired. The shaped light beam goes through a cylindrical lens 4 having a converging function in one direction, and a resulting line beam is incident to a polygonal mirror 5. The polygonal mirror 5, preferably having five reflection planes rotates at a constant rotational speed around its central axis, thereby deflecting the incident light beam on a reflection plane at a constant angular velocity.

The laser beam deflected by the polygonal mirror 5 travels through two converging lenses 6, which act as a converging device. The beam is reflected downward by a reflection mirror 8, which acts as a reflecting device, and is projected onto the surface of a photosensitive drum 7, shown in FIG. 3. The converging lenses 6, which project the deflected light beam onto the photosensitive drum 7 to form a small light spot, have the fθ characteristics for converting scanning at a constant angular velocity into scanning at a constant line speed on the photosensitive drum 7. The converging lenses 6 preferably comprise two lenses.

The light beam is modulated by a modulation circuit (not shown) in response to the image signal and scans the surface of the photosensitive drum 7, which rotates around its central axis, thereby forming a two-dimensional electrostatic latent image on the drum surface. The above-mentioned scanning is known as Raster scanning.

At image reading, the light beam emitted by the semiconductor laser 1 is directed to a source document 9 as seen in FIG. 3 on a document stage 10 by the reflection mirror 8, which is inclined upward as shown by the dashed line in this case. The mirror 8 is provided with a gear 18 on its longitudinal axis. The gear 18 engages with a worm gear 17 of a drive motor 16 so that the mirror 8 is swung up and down for the reading and printing operations, respectively.

During the one-dimensional scanning of the light beam on the document 9 by the rotation of the polygonal mirror 5, the document 9 is moved in the direction shown by the arrow by document feed rollers 91 and 92. Consequently, the document 9 is Raster scanned in a two-dimensional manner by the light beam.

The document 9 reflects the projected light, which returns over the same light path to the laser 1. The semiconductor laser 1, shown in FIG. 4, incorporates a photosensor 105, which converts the input light beam from the document 9 into an electrical signal.

Figure 4:
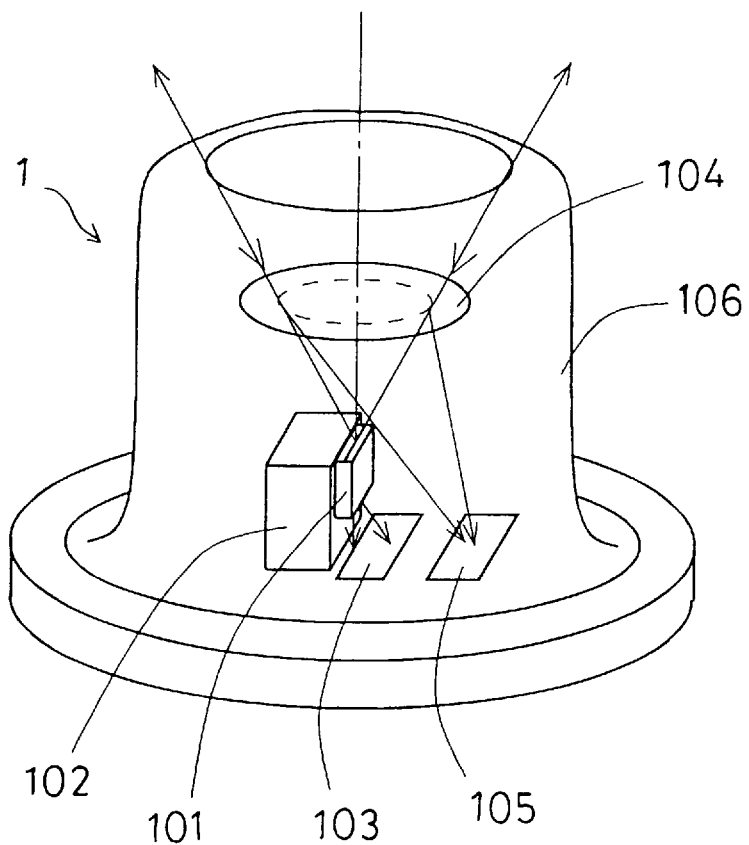
FIG. 4 is a perspective diagram showing the structure of the light source used in the optical scanning apparatus of this embodiment.

FIG. 4 explains the structure of the semiconductor laser 1. A laser element 101 is fixed on a metallic mount 102, which functions as a heat sink. The laser element 101 emits a laser beam used for image reading and printing from its front surface. It also emits a laser beam from the rear surface that is proportional in intensity to the front light beam and is used for the laser output stabilizing control by being detected by a photosensor 103.

Disposed in front of the laser element 101 is a beam splitter 104 for light path separation that allows the emitted laser beam to pass intact and the reflected light beam from the document to pass by being deflected. The return light beam from the document deflected by the beam splitter 104 is incident to another photosensor 105.

The beam splitter 104 can be a device that separates the light path based on the diffraction of light, and it is preferably a diffraction grating. These component parts including the laser element 101, mount 102, photosensor 103, beam splitter 104 and image beam photosensor 105 are all accommodated in a common laser diode case 106, allowing the accurate setup, compact design and easy handling of the light source.

Figure 5:
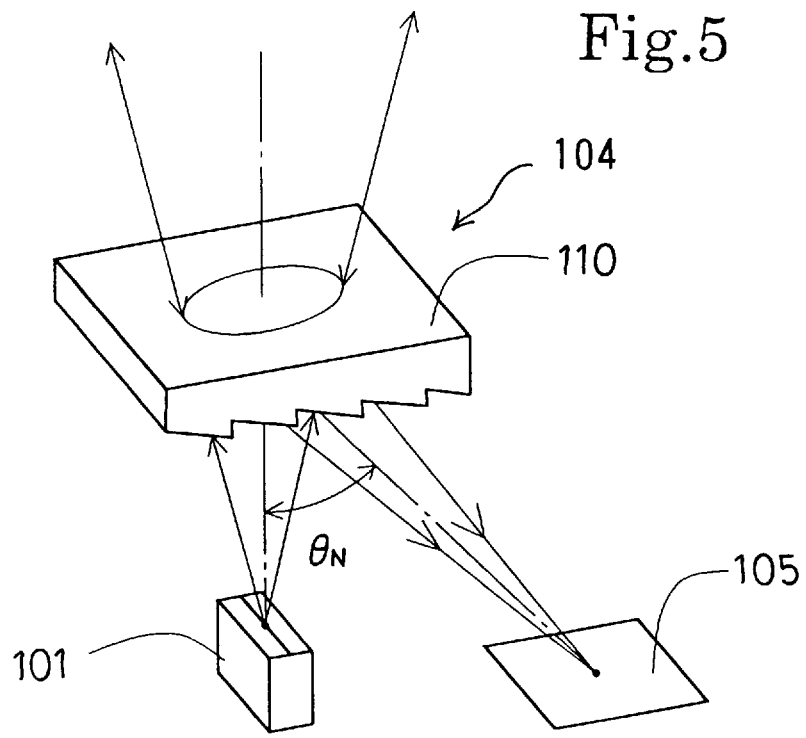
FIG. 5 is a perspective schematic diagram showing the structure of the diffraction grating used in the optical scanning apparatus of this embodiment.

FIG. 5 explains the structure of the beam splitter 104 formed of a diffraction grating 110. A light beam emitted by the laser element 101 passes intact as the 0th-order light through the beam splitter 104 without the rendition of diffraction by the diffraction grating 110. The return light beam from the document 9 on the same light path is incident to the diffraction grating 110, and is diffracted to become the 1st-order light with a diffraction angle θN and directed to the photosensor 105.

Figure 6:
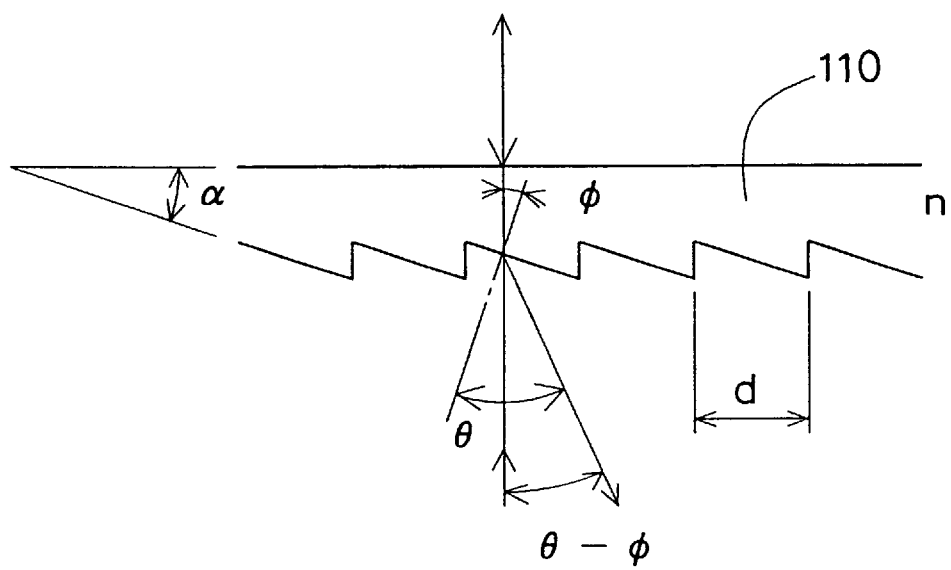
FIG. 6 is a schematic cross-sectional view of the diffraction grating of FIG. 5.

FIG. 6 explains the function of the diffraction grating 110. The diffraction grating 110 having a diffraction surface of the shape of saw-tooth wave is preferably made of glass or plastics with a reflective index of n. Of course, any suitable material may be used. The crude laser beam incident to the lower surface of the diffraction grating 110 passes intact through it and leaves from the upper surface as the 0th-order light. The reflected return light beam from the document 9 is diffracted on the diffraction surface, which has a pitch of "d" called the grating constant, by the amount of a diffraction angle θN as shown by the following formula:

$$\sin \theta_N = N\lambda/d \quad (N=0, \pm 1, \ldots) \tag{1}$$

where λ is the wavelength of laser, and N is the order of diffraction. N is set to be 1 for the 1st-order diffraction light used in this embodiment, and the following formula is induced.

$$\theta N = \sin - (\lambda/d) \quad (2)$$

Due to the blazed grating of the diffraction surface, the passing diffraction light is the 1st-order diffraction light. This effect is explained by analyzing the diffraction surface in detail. The return light beam from the document 9 is refracted on the diffraction surface as indicated by Snell's law. For a blaze angle of α, incident angle of φ to the blaze surface, and refraction angle of θ, the following formula holds.

$$n \cdot \sin \phi = \sin \theta \quad (3)$$

Since the 1st-order light is blazed, θN=θ−φ, and the above formula is revised as follows.

$$n \cdot \sin \phi = \sin \theta N \cdot \cos \phi + \cos \theta N \cdot \sin \phi$$

$$(n - \cos \theta N) \cdot \sin \phi = \sin \theta N \cdot \cos \phi$$

$$\tan \theta = \sin \theta N/(n - \cos \theta N) \quad (4)$$

Since α=φ, the blaze angle α is eventually expressed as follows.

$$\tan \alpha = \sin \theta N/(n - \cos \theta N) \quad (5)$$

Namely, the direction of diffraction determined from the grating constant "d" and the direction of refraction determined from the blaze angle are coincident. Therefore, the reflected passing light beam is diffracted at the angle θN. Specifically, the diffraction angle θN is determined from the location of the photosensor 105, and the grating constant "d" and blaze angle α are determined from it. For example, when the photosensor 105 is located at a position 5 mm right of the laser element 101 and 10 mm below the diffraction grating 110, the θN is determined to be 26.6°, and for λ=0.78 μm and n=1.5, the grating constant "d" is determined to be 1.74 μm and the blaze angle α is determined to be 36.5°.

Figure 7:
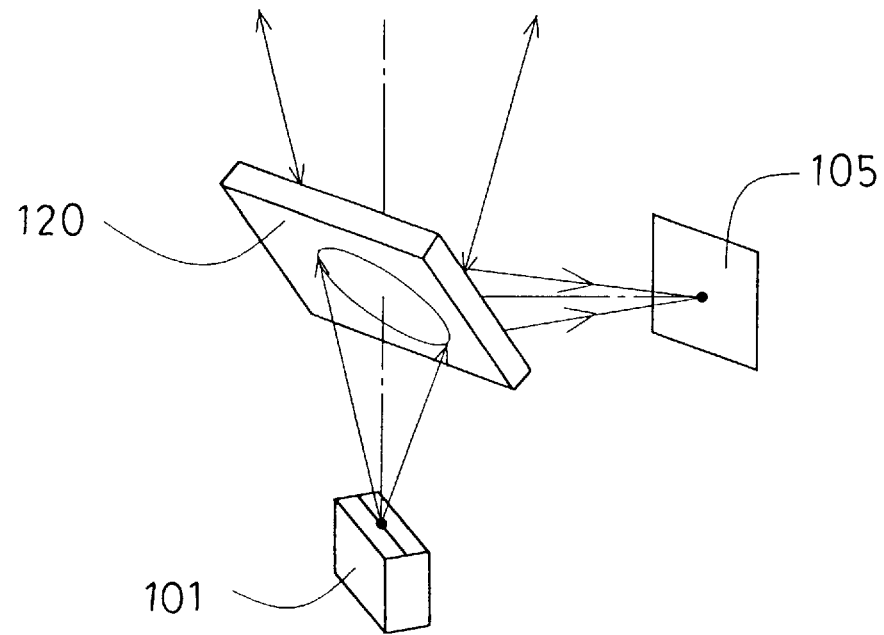
FIG. 7 is a schematic perspective diagram showing the structure of the half mirror used in the optical scanning apparatus of another embodiment.

FIG. 7 explains a beam splitter formed of a half mirror 120. A laser beam emitted by the laser element 101 goes through the half mirror 120 to reach the document 9. The reflected light from the document 9 comes back on the same light path and is reflected by the half mirror 120. The reflected light is received by the photosensor 105, which is located on the right of the half mirror 120 in the figure.

Figure 8:
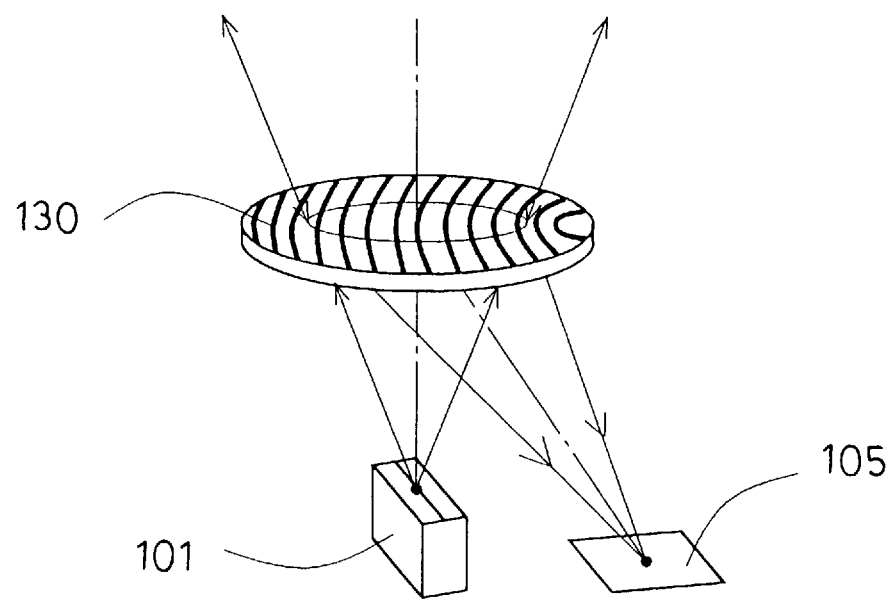
FIG. 8 is a schematic perspective diagram showing the structure of the hologram used in the optical scanning apparatus of another embodiment.

FIG. 8 explains a beam splitter formed of a hologram 130. A laser beam emitted by the laser element 101 goes through the hologram 130 to reach the document 9, and the reflected light from the document 9 comes back on the same light path and is incident to the hologram 130 again. The reflected light is received by the photosensor 105, which is located on the downward-right of the hologram 130 in the figure at a distance different from the distance between the laser element 101 and hologram 130. The hologram 130, in this case, has the formation of an interference pattern but any suitable pattern could be used.

When a beam splitter is formed of a light path separating device based on the diffraction effect, such as a diffraction grating or hologram, the crude laser beam emitted by the laser element is also subjected to the diffraction effect when it first passes the beam splitter. On this account, if the resulting stray light reaches the photosensitive drum 7 or document 9, the quantity of image reading and printing will be deteriorated. Therefore, it is necessary to provide a device that blocks only the diffracted light at a downstream position of the beam splitter where it does not block the 0th-order light. However, in order to provide an obscuring device at a downstream position of the deflecting device, the beam splitter must have its diffracting direction perpendicular to the scanning direction of the deflector.

Figure 9:
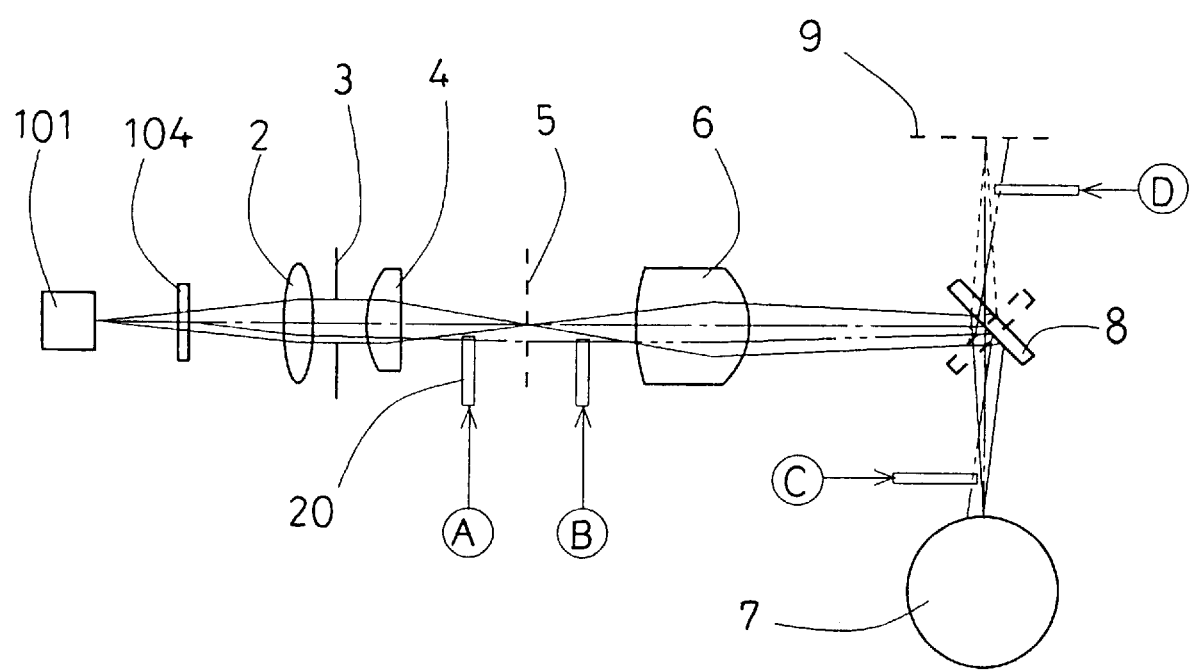
FIG. 9 is a schematic diagram that explains the light path of the optical scanning apparatus based on a preferred embodiment of this invention.

FIG. 9 shows schematically the light path of the optical scanning apparatus. A laser beam emitted by the laser element 101 is separated by the beam splitter 104 into a 0th-order light beam, which is not diffracted, shown by the dash-dot line and a 1st-order diffracted light beam shown by the dash-dot-dot line. The 1st-order light beam is diffracted in the up/down direction in the figure by the diffraction grating, which is formed in the depth direction of the figure. The 0th-order light beam converges once on the polygonal mirror 5 shown by the dashed line, and thereafter it diverges. The diverging light beam is converged again by the converging lens 6 onto the photosensitive drum 7 or document 9.

An obscuring device 20 is disposed such that it does not block the 0th-order light beam. There are at least four possible locations as indicated by A, B, and C and D. Namely, the obscuring device 20 is placed at one of the positions A and B, or alternatively it is placed at both of the positions C and D. By the provision of the obscuring device 20, unwanted diffracted light is prevented from reaching the photosensitive drum and document, and the quality of image reading and printing can be improved.

While particular embodiments of the present invention have been described, the present invention is not confined to these arrangements and changes and modifications are possible obviously.

For example, a nonlinear light emitting element such as a second harmonic generator may be used for the light source to produce a visible light beam having a shorter wavelength. This would enable the reading of source documents written with ink or dye that cannot be read by the apparatus using the near-infrared light. The reflection mirror for light path switching may be replaced with a half mirror or a half prism so that the apparatus, which projects light beams on to the source document and photosensitive drum concurrently, can be used as a copy machine.

What is claimed is:

1. An optical scanning apparatus having an image reading section and an image printing section that share a common optical system, comprising:

light source means for emitting a light beam in a light path disposed in a case;

deflecting means for deflecting the emitted light beam;

converging means for converging the deflected light beam;

a printing section that receives the converged light beam where an image is formed for printing based on the light beam;

a reading section that receives the converged light beam where an image is read from a source document and the light beam is reflected back toward the light source means;

path switching means for reflecting the converged light beam to one of the printing section and the reading section;

light path separation means disposed in the case for separating the light beam emitted from the light source means and the light beam reflected from the source document, and a photosensor disposed in the case and positioned to receive the light beam from the source document for conversion into an electrical signal; and light blocking means downstream of the light source means for blocking diffracted light resulting from the light beam initially emitted by the light source means from the printing section and the reading section.

2. The optical scanning apparatus of claim 1 wherein the deflecting means comprises a polygonal mirror mounted for constant rotation.

3. The optical scanning apparatus of claim 1 wherein the converging means comprises at least one converging lens that has fθ imaging plane characteristics.

4. The optical scanning apparatus of claim 1 wherein the converging means converts scanning at a constant angular velocity into scanning at a constant line speed.

5. The optical scanning apparatus of claim 1 wherein the printing section includes a photosensitive drum on which a two-dimensional electrostatic image is formed by Raster scanning.

6. The optical scanning apparatus of claim 1 wherein the reading section includes a movable document stage on a which a source document is supported for Raster scanning.

7. The optical scanning apparatus of claim 1 wherein the switching means comprises a movable mirror connected to a drive that swings the mirror to selectively reflect toward the printing section and the reading section.

8. The optical scanning apparatus of claim 1 wherein the light source means comprises a semiconductor laser.

9. The optical scanning apparatus of claim 1 wherein the light source means comprises a laser.

10. The optical scanning apparatus of claim 1 wherein the light path separation means comprises beam splitting means for diffracting the light beam from the source document in a direction that is perpendicular to a direction that the deflecting means deflects the emitted light beam.

11. The optical scanning apparatus of claim 1 wherein the light path separation means comprises a diffraction grating having a sawtooth diffraction surface that diffracts the light beam reflected from the source document to the photosensor.

12. The optical scanning apparatus of claim 1 wherein the light path separation means comprises a half mirror that reflects the light beam from the source document to the photosensor.

13. The optical scanning apparatus of claim 1 wherein the light path separation means comprises a hologram that reflects the light beam from the source document to the photosensor.

14. The optical scanning apparatus of claim 1 wherein the light blocking means is positioned between the light source means and the converging means.

15. The optical scanning apparatus of claim 1 wherein the light blocking means comprises two obscuring devices one positioned between the path switching means and the printing section and another positioned between the path switching means and the reading section.

16. An optical scanning apparatus comprising:
a light source disposed inside a case that emits a light beam in a light path;
a deflector that deflects the light beam from the light source;
a photosensitive member that receives the deflected light beam and forms an electrostatic latent image based on the light beam;
a source document support section that supports a source document for reading disposed opposite to the photosensitive member;
a reflecting device located between the photosensitive member and the source document support section that selectively reflects the light beam from the deflector to the source document support section to read a source document and to the photosensitive member to form an electrostatic latent image on the photosensitive member,
wherein the case for the light source also houses a light path separation device including a beam splitter that separates the light beam in the light path from the light source and the light beam from reading the source document, and directs the light beam from the source document to a photosensor that converts the light beam to electrical signals, wherein the beam splitter separates the light beam based on a diffraction effect; and
a light blocking device located on the light path that prevents diffracted light produced by the beam splitter from reaching the photosensitive member and the source document.

17. The optical scanning apparatus of claim 16, wherein the light source comprises a laser that emits a directive light beam.

18. The optical scanning apparatus of claim 17, wherein the laser is a semiconductor laser.

19. The optical scanning apparatus of claim 16, wherein the light source comprises one of a semiconductor laser and a solid laser, with an output wavelength being shortened by a nonlinear optical device.

20. The optical scanning apparatus of claim 16, wherein diffracted light produced by the beam splitter has a diffraction direction perpendicular to a scanning direction of the deflector.

21. The optical scanning apparatus of claim 16, wherein the beam splitter comprises a half mirror.

22. The optical scanning apparatus of claim 16, wherein the beam splitter comprises a hologram.

23. The optical scanning apparatus of claim 16, further comprising a converging device located between the deflector and the reflecting device, wherein the converging device comprises a lens having fθ imaging plane characteristics.

24. A method of printing an image and reading an image using a common optical system, comprising the steps of:
emitting a light beam in a light path from a light source;
deflecting the light beam to a reflector;
positioning the reflector to reflect the light beam to one of a printing section and a reading section;
forming an image based on the light beam at the printing section when the light beam is reflected to the printing section; and
reading the source document by reflecting the light beam from the source document back toward the light source to a photosensor to convert the light beam to electrical signals when the light beam is reflected to the reading section, including blocking diffracted light from the light beam from reaching the photosensor and the source document.

25. The method of claim 24 further comprising the step of housing the light source and the photosensor in a common case.

26. The method of claim 25 wherein the step of reading the source document includes the step of separating the light path to allow the light beam emitted from the light source to pass and to aim the light beam reflected back from the source document to the photosensor.

27. The method of claim 26 wherein the step of aiming the light beam reflected back from the source document includes diffracting the light beam using a diffractor selected from the group of a sawtooth diffraction grating and a hologram.

* * * * *